US009335749B2

(12) United States Patent
Akashi et al.

(10) Patent No.: US 9,335,749 B2
(45) Date of Patent: May 10, 2016

(54) SEMICONDUCTOR DATA PROCESSING APPARATUS AND ENGINE CONTROL APPARATUS

(71) Applicant: Renesas Electronics Corporation, Kawasaki-shi, Kanagawa (JP)

(72) Inventors: Kenichi Akashi, Kawasaki (JP); Naohiko Shimoyama, Kawasaki (JP)

(73) Assignee: Renesas Electronics Corporation, Tokyo (JP)

( * ) Notice: Subject to any disclaimer, the term of this patent is extended or adjusted under 35 U.S.C. 154(b) by 539 days.

(21) Appl. No.: 13/901,528

(22) Filed: May 23, 2013

(65) Prior Publication Data
US 2013/0317631 A1 Nov. 28, 2013

(30) Foreign Application Priority Data
May 25, 2012 (JP) ................................. 2012-119313

(51) Int. Cl.
| G05B 11/01 | (2006.01) |
| F02M 51/00 | (2006.01) |
| H02P 7/06 | (2006.01) |
| H02P 7/29 | (2006.01) |
| F16H 59/74 | (2006.01) |
| H02P 1/30 | (2006.01) |
| H02P 1/52 | (2006.01) |
| H02P 3/00 | (2006.01) |

(Continued)

(52) U.S. Cl.
CPC ................ G05B 15/02 (2013.01); G01P 3/489 (2013.01)

(58) Field of Classification Search
CPC . G01P 3/489; F02D 2041/2027; F02D 41/06; H02P 7/29; F02P 5/1506
USPC .............. 700/71; 123/475, 478; 318/503; 375/354, 238; 388/804, 811, 819; 477/102; 701/113
See application file for complete search history.

(56) References Cited

U.S. PATENT DOCUMENTS

| 4,312,315 A | 1/1982 | Takase |
| 4,953,531 A * | 9/1990 | Abe ...................... F02P 5/1506 123/406.53 |

(Continued)

FOREIGN PATENT DOCUMENTS

| EP | 1 953 376 A2 | 8/2008 |
| GB | 2 048 520 A | 12/1980 |

(Continued)

OTHER PUBLICATIONS

Extended European Search Report issued Sep. 9, 2014, in European Patent Application No. 13 16 8438.

*Primary Examiner* — Ronald Hartman, Jr.
(74) *Attorney, Agent, or Firm* — Shapiro, Gabor and Rosenberger, PLLC

(57) ABSTRACT

The reliability in detection of toothless part is improved. A first counter counts a clock signal from an initial value for each of pulse intervals of a predetermined event pulse train and the count value of the first counter is held in a register for each of pulse intervals. Further, the second counter counts the clock signal from an initial value so that the count value thereof is equal to plural times of the count value of the first counter for each of the pulse intervals. A timer function which can detect any of a first state in which the count value of the first counter is equal to or larger than a first reference value and a second state in which the count value of the second counter is equal to or smaller than the value held in the register for each of the pulse intervals is adopted.

20 Claims, 4 Drawing Sheets

(51) Int. Cl.
*G06F 19/00* (2011.01)
*G06G 7/70* (2006.01)
*G05B 15/02* (2006.01)
*G01P 3/489* (2006.01)

(56) References Cited

U.S. PATENT DOCUMENTS

| | | | | |
|---|---|---|---|---|
| 5,264,844 A | * | 11/1993 | Itou | F02D 41/009 341/11 |
| 5,357,928 A | * | 10/1994 | Ohtsuka | F02D 37/02 123/406.47 |
| 6,170,468 B1 | * | 1/2001 | Wada | F02D 41/062 123/476 |
| 6,378,358 B1 | * | 4/2002 | Hirakata | F02D 37/02 73/114.27 |
| 7,757,659 B2 | * | 7/2010 | Kurotani | F02D 19/081 123/295 |
| 2001/0011206 A1 | | 8/2001 | Ando | |
| 2004/0255902 A1 | * | 12/2004 | Sawada | F02D 31/001 123/339.11 |
| 2005/0228575 A1 | * | 10/2005 | Murakami | F02D 41/042 701/112 |
| 2008/0189024 A1 | | 8/2008 | Kondo | |
| 2009/0292448 A1 | * | 11/2009 | Nakagawa | F02D 35/023 701/103 |

FOREIGN PATENT DOCUMENTS

| | | |
|---|---|---|
| JP | 2001-200747 A | 7/2001 |
| JP | 2001-271700 A | 10/2001 |
| JP | 2005-133614 A | 5/2005 |
| JP | 2006-125240 A | 5/2006 |
| JP | 2010-025017 A | 2/2010 |

* cited by examiner

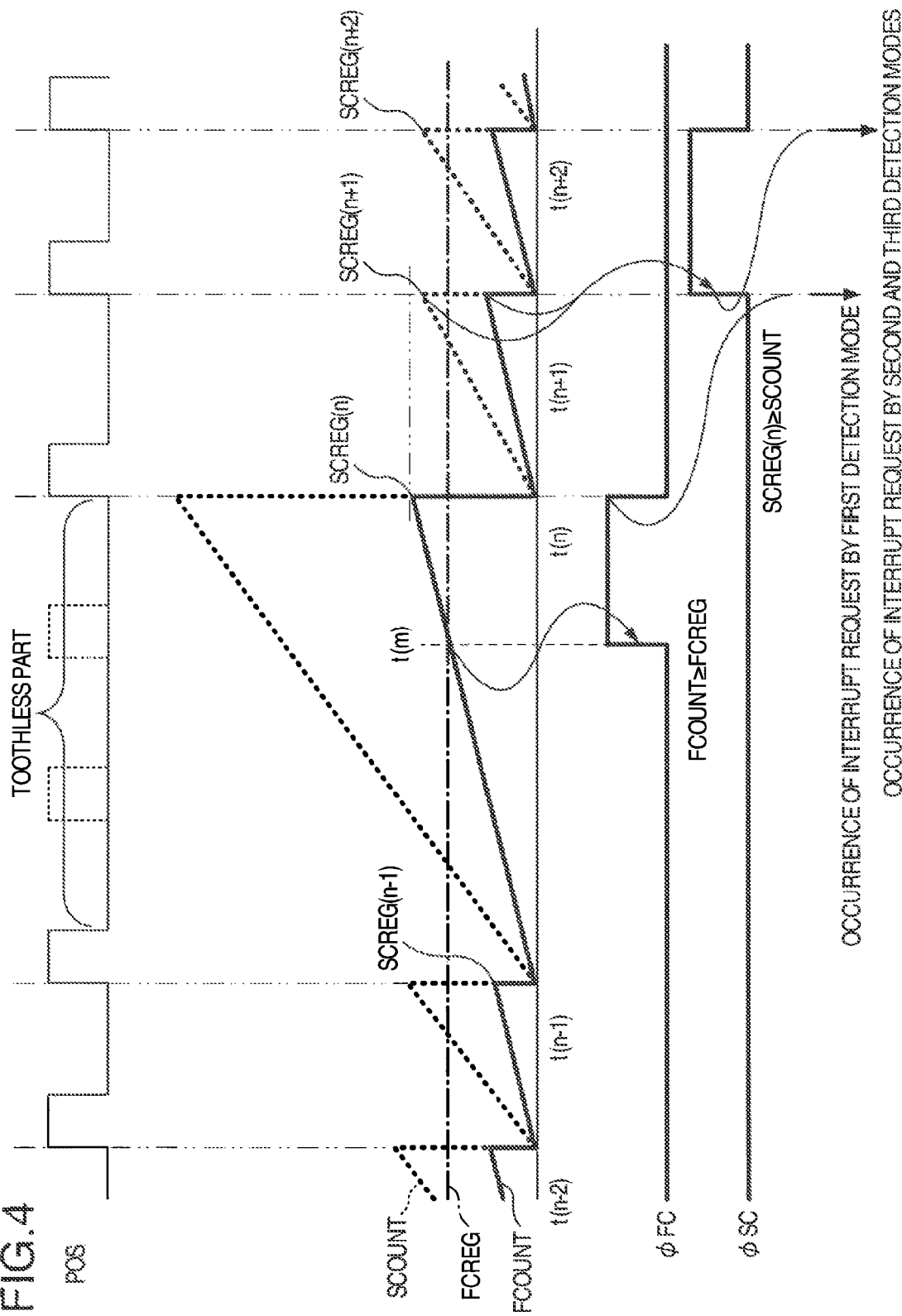

SEMICONDUCTOR DATA PROCESSING APPARATUS AND ENGINE CONTROL APPARATUS

INCORPORATION BY REFERENCE

The present application claims priority from Japanese application JP2012-119313 filed on May 25, 2012, the content of which is hereby incorporated by reference into this application.

BACKGROUND OF THE INVENTION

The present invention relates to the pulse detection technique in the semiconductor data processing apparatus and of detecting pulses in response to rotation of a crank shaft in an engine control apparatus and more particularly to the technique effective for application to engine control of a gasoline-engined car and a hybrid car, for example.

Heretofore, the engine control apparatus is supplied with signals from various sensors such as a crank shaft sensor, a water temperature sensor, an atmosphere temperature sensor and the like to control the fuel injection and the ignition timing in optimum. A crank signal which is a signal produced from the crank shaft sensor is a train of pulses produced at intervals of predetermined angle corresponding to rotation of a crank shaft of an engine. The engine control apparatus produces a multiple clock (which has the period equal to a submultiple of the multiple of a period of the crank signal) having a frequency equal to the multiple of tire frequency of the crank signal, for example, and the multiple clock is counted up by a crank counter of which the count value represents a rotation angle (so-called crank angle) of the crank shaft, so that the control synchronized with rotation of the engine is made on the basis of the value of the crank counter. By doing so, the crank angle can be grasped with finer resolution as compared with the original crank signal.

The crank signal has a toothless part (reference position part) where pulses are lacking on the way of the pulse train. For example, in the toothless structure in which two pulses are lacking every 60 pulses in the crank signal the toothless part appears two times in one cycle (crank rotation angle of 720 degrees) of the engine, that is, one toothless pan appears once every 360 degrees of the crank rotation angle. In the engine control, detection of the toothless part is made to the pulse train of the crank signal in order to make the control synchronized with tire engine cycle.

In order to detect the toothless part, the multiple clock signals having the frequency equal to the multiple of the frequency of the crank signal for example, are counted up for each pulse of the crank signal to thereby measure a pulse interval of the crank signal. When the count value at the pulse interval of the crank signal being measured this time is equal to or larger than a reference value obtained by multiplying the count value at the pulse interval where there is no toothless part by a predetermined toothless-part judgment ratio, it is judged that the pulse interval being measured this time is the toothless part. The toothless-part detection operation and the like are described in JP-A-2005-133614, JP-A-2001-271700, JP-A-2006-125240 and JP-A-2010-025017.

SUMMARY OF TOE INVENTION

The Inventor has studied the detection of toothless part and as a result of it found the following problems.

First, the crank has the acceleration increased at a position corresponding to a position just after a dead point of a piston and accordingly when the toothless part is detected in a position just after a top dead point of the piston going in a combustion process at the top dead point, it is anticipated that the count value at the pulse interval in the toothless part does not reach the reference value, so that it has been found that there is a possibility that detection of the toothless part is mistaken.

Second, in order to solve the first problem, the toothless-part detection operation may be made on the basis of comparison of actual count values at the pulse intervals before and after the toothless part, although in this case it is necessary to measure the count values before and after the toothless part actually and make division to judge whether the ratio thereof exceeds a threshold value or not. Accordingly, it takes time to perform this processing and it is made clear that there is a problem in the real-time property of the engine control.

Third, when an engine is started while traveling by motor driving like a hybrid car, vibration of the engine and a rotation sensor is increased in traveling at a low speed, so that error in the count value at the pulse interval is increased and it has been found that there is a possibility that detection of the toothless part is mistaken in the same manner as in the first case.

The measures for solving the above problems are described below and other problems and novel features of the present invention will be apparent from the following description of the specification taken in connection with the accompanying drawings.

An outline of representative aspects of the present invention disclosed in the specification is described in brief as follows.

Namely, a first counter counts a clock signal from an initial value for each pulse interval of a predetermined event pulse train and the count value of the first counter is held in a register for each pulse interval. Further, the second counter counts the clock signal from an initial value so that the count value thereof is equal to plural times of the count value of the first counter for each pulse interval. A timer function which can detect any of a first state in which the count value of the first counter is equal to or larger than a first reference value and a second state in which the count value of the second counter is equal to or smaller than the value held in the register for each pulse interval is adopted.

The effects attained by the representative aspects of the present invention disclosed in the specification are described in brief as follows.

Namely, the fact that large pulse interval exists behind can be judged on the basis of small pulse interval existing before by means of the first state and the fact that small pulse interval exists behind can be lodged on the basis of large pulse interval existing before by means of the second state, so that the reliability in detection of toothless part can be improved.

Other objects, features and advantages of the invention will become apparent from the following description of the embodiments of the invention taken in conjunction with the accompanying drawings.

BRIEF DESCRIPTION OF THE DRAWINGS

FIG. 4 is a timing chart showing an example of the toothless-part detection processing operation of the timer part of FIG. 1.

DESCRIPTION OF THE EMBODIMENTS

1. Outline of Embodiment

Figure 1:
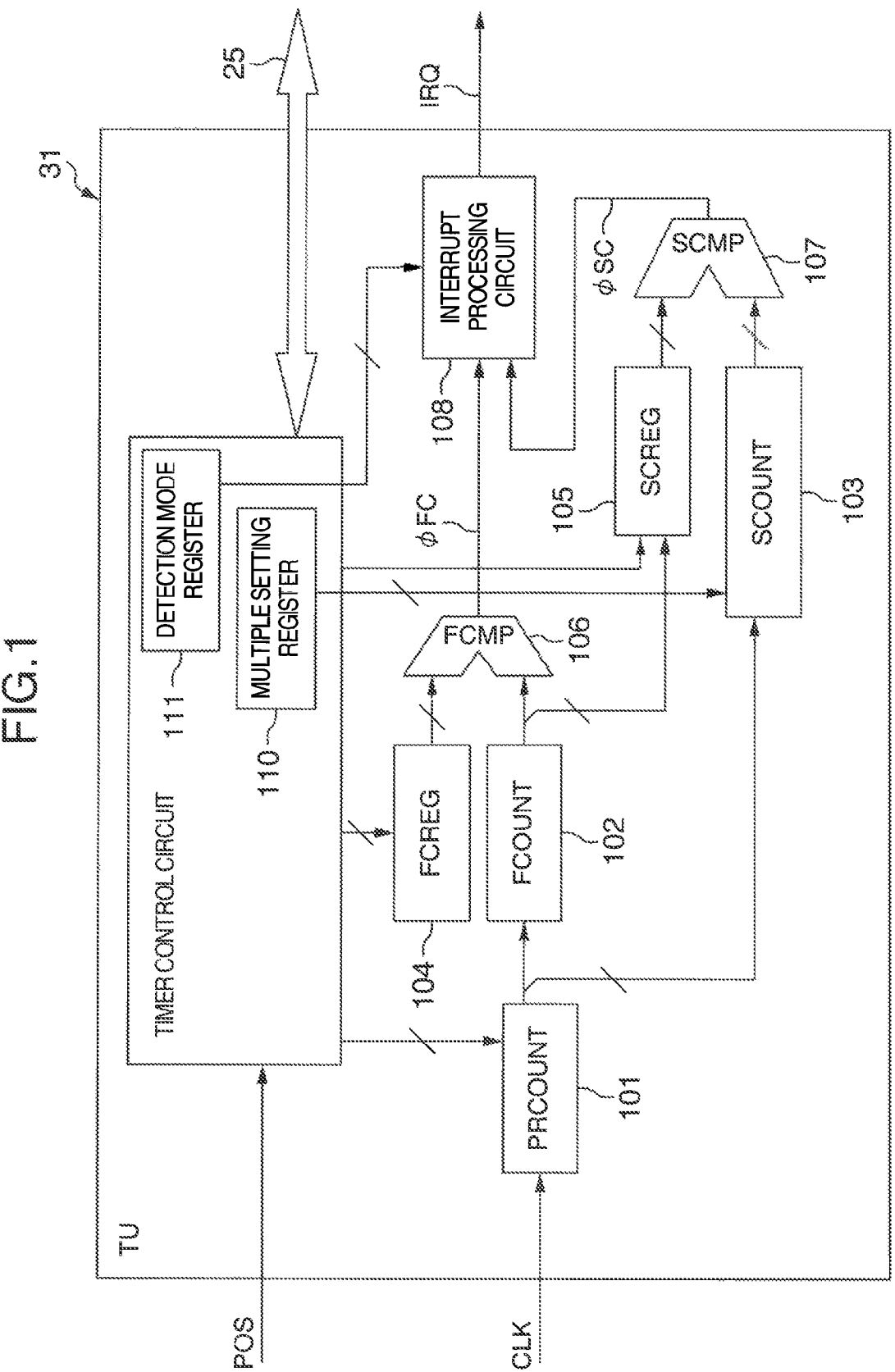
FIG. 1 is a block diagram schematically illustrating an example of a timer part.

First, an outline of a representative embodiment disclosed in the present invention is described. Reference numerals in the drawings referred to in the description of the outline in the representative embodiment and put in parentheses merely exemplify elements contained in the concept of constituent elements having the reference numerals added thereto.

[1] <Detection of Long Event Pulse Based on Short Event Pulse in Hardware Manner and Reverse Detection Thereof>

A semiconductor data processing apparatus (11) according to a representative embodiment includes a CPU to execute programs and a timer part (31) connected to the CPU. The timer part includes a first counter (102) to make counting operation from an initial value for each pulse interval of a predetermined event pulse train and a first count register (104) to which a first reference value is set. Further, the timer part includes a second counter (103) to make counting operation from an initial valise for each pulse interval of the predetermined event pulse train so that its count value is equal to plural times of the count value of the first counter and a second count register (105) which holds the count value of the first counter for each pulse interval of the predetermined event pulse train. Moreover, the timer part includes detection circuits (106, 107 and 108) capable of detecting any of a first state in which the count value for each pulse interval by the first counter is equal to or larger than the first reference value set in the first count register and a second state in which the count value for each pulse interval by the second counter is equal to or smaller than the value held in the second count register.

According to the above, the pulse interval (large pulse interval) corresponding to the count value equal to or larger than the reference value by the first counter can be distinguished from the pulse interval (small pulse interval) corresponding to the count value smaller than the reference value by the first counter by means of the judgment of the first state. It can be judged by means of the judgment of the second state that the count value by the second counter for making the counting of plural times of the count value of the first counter is smaller than the count value of the first counter at the last pulse interval that is, the count value at small pulse interval by the second counter is smaller than the count value at large pulse interval by the first counter. In brief, the fact that the large pulse interval exists behind can be distinguished on the basis of the small pulse interval existing before by detecting the first state and the fact that the small pulse interval exists behind can be distinguished on the basis of the large pulse interval existing before by detecting the second state. When occurrence of the situation in which the count values of plural pulse intervals containing the toothless part are small is anticipated, the toothless part can be detected exactly by detecting the second state in the pulse detection case where it is considered that the detection accuracy of toothless part is reduced in detection of the first state. The detection of the first and second states is performed in hardware using the counting operation by counters and comparison of count value and register value and accordingly the processing time can be shortened as compared with division of count values obtained from the pulse intervals before and after the toothless part.

[2] <Logical Sum of Long Event Pulse Detection Remit Based on Short Event Pulse and Reverse Detection Result Thereof>

In the item 1, the detection circuits can select any of the first detection mode in which materialization of the first state is detected and the second detection mode in which materialization of the second state is detected.

According to the above, any one of detection modes can be selected in accordance with the situation of pulse detection in the field to which the present invention is applied.

[3] <Logical Product of Long Event. Pulse Detection Based on Short Event Pulse and Reverse Detection Result Thereof>

In the item 2, the detection circuit further can select a third detection mode in which materialization of both the first and second states is detected.

According to the above, the third detection mode having the highest pulse detection accuracy can be provided easily using the logical product of the first detection and the second detection.

[4] <Logical Product of Long Event Pulse Detection Based on Short Event Pulse and Reverse Detection Result Thereof>

In the item 1, the detection circuit can select the third detection mode in which materialization of both the first and second states is detected.

According to the above, the third detection mode having the highest pulse detection accuracy can be provided easily using the logical product of the first detection and the second detection.

[5] <Multiple Setting Register>

In the item 1, 2 or 4, there is provided a multiple setting register (110) which designates a multiple that is plural times of the count value of the first counter in the second counter.

According to the above, the multiple can be set in a programmable manner easily.

[6] <Detection Mode Register>

In the item 2, there is provided a detection mode register (111) for designating which of the first detection mode or the second detection mode is selected.

According to the above, the detection mode can be set in a programmable manner easily.

[7] <Detection Mode Register>

In the item 3, there is provided the detection mode register (111) for designating which of the first, second or third detection mode is selected.

According to the above, the detection mode can be set in a programmable manner easily.

[8] <Disposition of Multiple Setting Register and Detection Mode Register in CPU Space>

In the item 5, 6 or 7, the multiple setting register and the detection mode register are registers disposed in address space of the CPU.

According to the above, the multiple setting register and the detection mode register can be set easily using CPU.

[9] <Addition of Set Multiple Value>

In the item 5, the second counter makes increment operation in which a set value of the multiple setting register is added to a count value just before the addition for each increment of +1 counted by the first counter.

According to the above, the structure in which the count value is increased to plural times of the count value of the first counter can be realized easily as compared with the structure in which the frequency of clocks to be counted is multiplied in accordance with the multiple value.

[10] <Interrupt>

In the item 2, there is further provided an interrupt control part (30) which controls an interrupt to the CPU in response to an interrupt request (IRQ) from the timer part. At this time, the detection circuit supplies an interrupt request signal to the interrupt control pan by detecting materialization of the first state when the first detection mode is designated and supplies an interrupt request signal to the interrupt control part by detecting materialization of the second state when the second detection mode is designated.

According to the above, the CPU can move to the interrupt processing responsive to the detection result according to the first or second detection mode.

[11] <Interrupt>

In the item 3, there is further provided an interrupt control part (30) which controls an interrupt to the CPU in response to an interrupt request (IRQ) from the timer part. The detection circuit supplies an interrupt request signal to the interrupt control part by detecting materialization of the first state when the first detection mode is designated, supplies an interrupt request signal to the interrupt control part by detecting materialization of the second state when the second detection mode is designated and supplies an interrupt request signal to the interrupt control part by detecting materialization of the third state when the third detection mode is designated.

According to the above, the CPU can move to the interrupt processing responsive to the detection result according to the first, second or third detection mode.

[12] <ECU for Engine Control>

An engine control apparatus (2) according to another representative embodiment includes an interface pan (10) which produces a train of pulses at predetermined angular intervals corresponding to rotation of a crank shaft of an engine in response to an output of a crank angle sensor (3) and a data processing part (11) which is supplied with the pulse train produced from the interface part and judges a fixed position of tire crank shaft on the basis of difference in pulse intervals of the pulse train. The data processing part includes the first counter (102) which makes counting operation from an initial value for each pulse interval of the predetermined event pulse train and the first count register (104) in which the first reference value is set. Further, the data processing part includes a second counter (103) for making counting operation from an initial value for each pulse interval of the predetermined event pulse train so that its count value is equal to plural times of the count value of the first counter and a second count register (105) for holding the count value of the first counter for each pulse interval of the predetermined event pulse train. Moreover, the data processing part includes detection circuits (106, 107 and 108) capable of detecting any of a first state in which the count value for each pulse interval by the first counter is equal to or larger than the first reference value set in the first count register in order to judge the fixed position of the crank shaft and a second state in which the count value for each pulse interval by the second counter is equal to or smaller than the value held in the second count register and control circuits (20, 21, 22) which control the engine on the basis of detection results of the detection circuits.

According to the above, the pulse interval (large pulse interval) corresponding to the count value equal to or larger than the reference value by the first counter can be distinguished from the pulse interval (small pulse interval) corresponding to the count value smaller than the reference value by the first counter by means of the judgment of the first state. It can be judged by means of the judgment of the second state that the count value by the second counter for making the counting of plural times of the count value of the first counter is smaller than the count value of the first counter at the last pulse interval, that is, the count value at large pulse interval by the first counter is smaller than the count value at small pulse interval by the second counter. In brief, the feet that the large pulse interval exists behind can be judged on the basis small pulse interval existing before by detecting the first state and the fact that the small pulse interval exists behind can be judged on the basis of large pulse interval existing before by detecting the second state, so that the engine can be controlled on the basis of the judgment result. When occurrence of the situation in which the count values at plural pulse intervals containing the toothless part are small is anticipated, the toothless part can be detected exactly by detecting the second state in the pulse detection case where it is considered that the detection accuracy of toothless part is made low in detection of the first state. The detection of the first and second states is performed in hardware using the counting operation by counters and comparison of count value and register value and accordingly the processing time can be shortened as compared with division of count values obtained from the pulse intervals before and after the toothless part.

[13] <Logical Sum of Long Event Pulse Detection Result Based on Short Event Pulse and Reverse Detection Result Thereof>

In the item 12, the detection circuit is set to any of the first detection mode for detecting materialization of the first state or the second detection mode for detecting materialization of the second state in accordance with the state of the detection mode register (111) in order to judge the fixed position of the crank shaft.

According to the above, any one of the detection modes can be selected in accordance with the situation of pulse detection in the field to which the present invention is applied.

[14] <Logical Product of Long Event Pulse Detection Based on Short Event Pulse and Reverse Detection Result Thereof>

In the item 12, the detection circuit is set to any of the first detection mode for detecting materialization of the first state, the second detection mode for detecting materialization of the second state or the third detection mode for detecting materialization of both the first and second states in accordance with the state of the detection mode register (111) in order to judge the fixed position of the crank shaft.

According to the above, the third detection mode having the highest pulse detection accuracy can be provided easily using the logical product of the first detection and the second detection.

[15] <Logical Product of Long Event Pulse Detection Based on Short Event Pulse and Reverse Detection Result Thereof>

In the item 12, the detection circuit is set to the third detection mode for detecting materialization of both the first and second states as the detection mode for judging the fixed position of the crank shaft.

According to the above, the third detection mode having the highest pulse detection accuracy can be provided easily using the logical product of the first detection and the second detection.

[16] Multiple Setting Register>

In any one of the items 12 to 15, there is provided the multiple setting register (110) which designates a multiple that is plural times of the count value of the first counter in the second counter.

According to the above, the multiple can be set in a programmable manner easily.

[17] <Addition of Set Multiple Value>

In the item 16, the second counter makes increment operation in which a set value of the multiple setting register is added to a count value just before the addition thereof for each increment of +1 by the first counter.

According to the above, the structure in which the count value is increased to plural times of the count value of the first counter can be realized easily as compared with the structure in which the frequency of clocks to be counted is multiplied in accordance with the multiple value.

[18] <Disposition of Multiple Setting Register and Detection Mode Register in CPU Space>

In any one of the items 12 to 17, the data processing part includes CPU (20) and the multiple setting register and the detection mode register are registers disposed in address space of the CPU.

According to the above, the multiple setting register and the detection mode register can be set easily using the CPU.

[19] <Microcomputer>

In the item 18, the data processing part is a microcomputer (11) constituted of semiconductor integrated circuits.

Pulse judgment and engine control in the data processing part can be supported easily using program control.

[20] <1<Multiple≤Multiple Value of Short Pulse Rotation Angle to Long Pulse Rotation Angle>

In the item 12, the pulse intervals of the pulse train contain the first pulse intervals corresponding to the first rotation angle in one rotation of the crank shaft of the engine and the second pulse intervals corresponding to the second rotation angle that is plural times of the first angle. At this time, the multiple which can be set in the multiple setting register is smaller than a value corresponding to the multiple that is the plural times of the first rotation angle to the second rotation angle and is larger than 1.

Consequently, the high reliability to the judgment result of the second state can be guaranteed easily.

2. Detailed Description of Embodiment

An embodiment is described in more detail.

Figure 2:
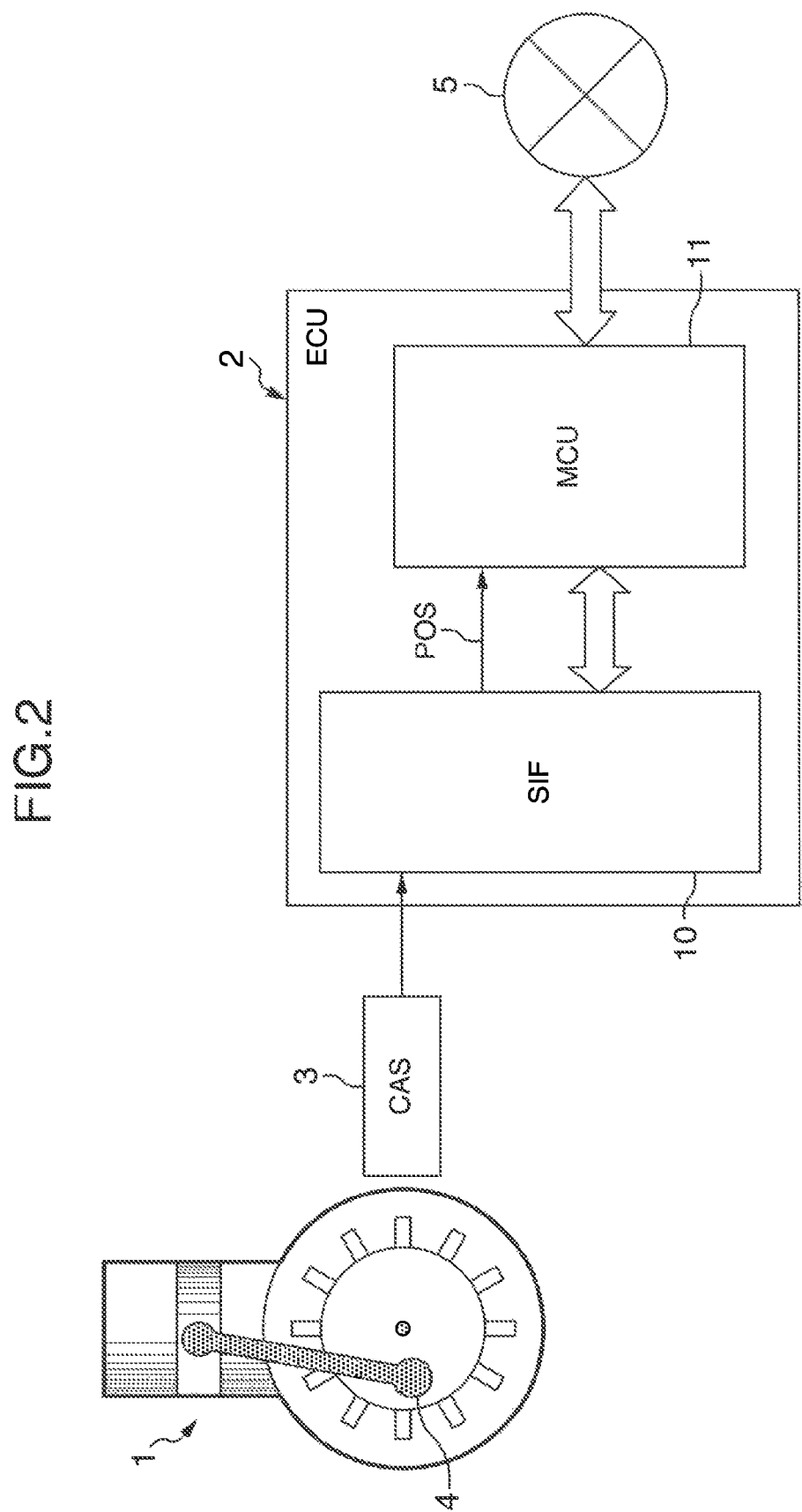
FIG. 2 is a block diagram schematically illustrating an engine control system.

FIG. 2 schematically illustrates an engine control system according to an embodiment. The engine control system is a system which performs timing control for fuel injection, fuel ignition, exhaust and the like to a reciprocating engine 1 having a predetermined number of cylinders such as, for example, 3, 6, 4 or 8 cylinders by means of an engine control unit (ECU) 2 functioning as an electronic control apparatus. The engine control unit 2 is connected to another electronic control apparatus through a proper network (MNET) 5 mounted in a car. In the embodiment, a crank angle sensor (CAS) 3 is shown representatively as a sensor for obtaining information necessary for engine control. A disk having an outer periphery on which a lot of teeth are formed, for example, is mounted on a crank shaft 4 of the engine 1 and the crank angle sensor 3 is provided with magnetic coils or photodiodes which produce pulses in response to intervals of the teeth. Toothless part where plural teeth are lacking is formed in a fixed position on the outer periphery of the disk. In FIG. 2, an outline of one cylinder of the reciprocating engine 1 is schematically illustrated in a longitudinal sectional view.

In the engine control unit 2, pulses detected by the crank angle sensor 3 are supplied to a sensor interface (SIF) 10 functioning as an interface part to produce a crank signal POS and a microcomputer (MCU) 11 functioning as the data processing part to which the crank signal POS is supplied controls the engine. The crank signal POS is a train of pulses generated at intervals of predetermined angle in response to rotation of the crank shaft of the engine. The microcomputer 11 generates a multiple clock (which has the period equal to a submultiple of the multiple of the period of the crank signal) having a frequency equal to the multiple of the frequency of the crank signal, for example, and the multiple clock is counted up by a crank counter representing a rotation angle (so-called crank angle) of the crank shaft, so that the control synchronized with rotation of the engine is made on the basis of the value of the crank counter. By doing so, the crank angle can be grasped with finer resolution as compared with the original crank signal POS.

The crank signal POS has a toothless part (reference positron part) in which pulses are lacking on the way of the pulse train. For example, in the toothless structure in which two pulses are lacking every 60 pulses in the crank signal POS, the toothless part appears two times in one cycle (crank rotation angle of 720 degrees) of the engine, that is, one toothless part appears once every 360 degrees of the crank rotation angle. In the engine control, processing of detecting the toothless part (toothless-part detection processing) is made to the pulse train of the crank signal POS in order to made the control synchronized with the engine cycle. The toothless-part detection processing is performed by the data processing part for judging the toothless part of the crank signal POS on the basis of difference in pulse intervals of the pulse train of the crank signal POS. The data processing part is realized by the microcomputer 11.

Figure 3:
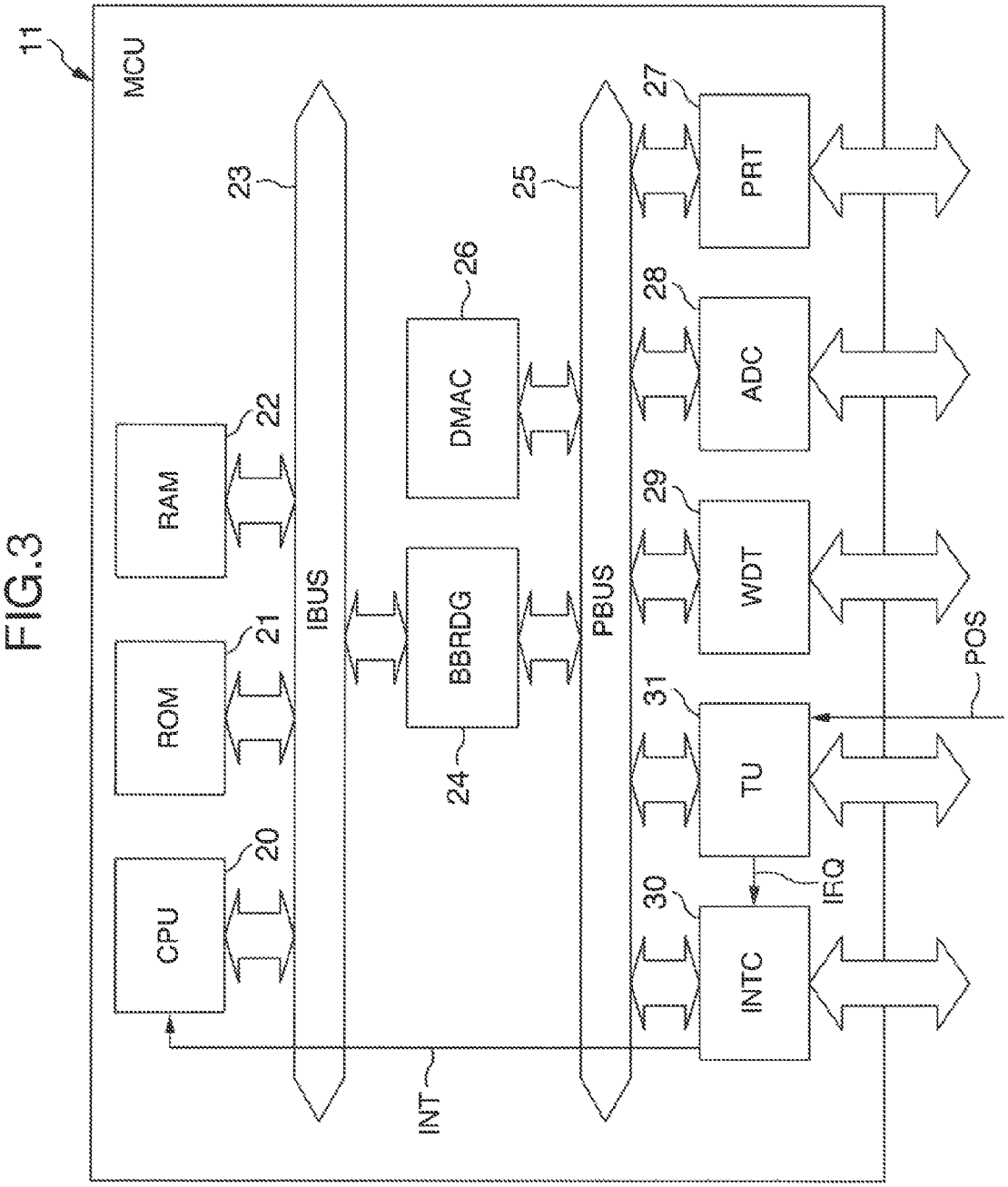
FIG. 3 is a block diagram schematically illustrating an example of a microcomputer.

FIG. 3 schematically illustrates the microcomputer 11. The microcomputer 11 includes a CPU (central processing unit) 20 for executing programs, an ROM 21 in which programs executed by the CPU 20 are stored and an RAM 22 used as work area and the like of the CPU 20 as control circuits and these elements are connected in common to an internal bus (IBUS) 23 having relatively fast transfer speed, although particularly not limited.

The internal bus 23 is connected to a peripheral bus (PBUS) 25 having relatively slow transfer speed through a bus bridge circuit 24 relatively.

Connected to the peripheral bus 25 are a direct memory access controller (DMAC) 26, an input/output port (PRT) 27, an analog-to-digital conversion circuit (ADC) 28 for converting an analog signal inputted externally into digital data, a watchdog timer (WDT) 29 for detecting excursion of CPU, an interrupt controller (INTC) 30, a timer part (TU) 31 and the like.

The CPU 11 may be grasped as a processor core. In this case, the processor core may contain an accelerator such as a digital signal processing processor, a cache memory, an address conversion buffer for virtual memory and the like.

The interrupt controller 30 performs interrupt priority control, factor judgment and the like in response to an interrupt request from a circuit module in the microcomputer 11 such as the timer part 31 and an interrupt request from the outside of the microcomputer 11 and controls to issue an interrupt signal responsive to the received interrupt request to the CPU.

The timer part 31 has the timer function such as input capture, free-running and pulse interval measurement and the toothless-part detection processing function, although particularly not limited.

FIG. 1 schematically illustrates the timer part. In this drawing, the timer part is illustrated to have the toothless-part detection processing function as a primary point. The timer part 31 includes a timer control circuit 100 which is supplied with the crank signal POS as the predetermined event pulse train and grasps rising edges of the pulses as crank pulse events to control the timer operation for the toothless-part detection processing on the basis of the grasped crank pulse events.

The timer part 31 includes a pre-stage counter (PRCOUNT) 101, a first counter (FCOUNT) 102 and a second counter (SCOUNT) 103 as counters used in timer operation for the toothless-part detection processing and further includes a first count register (FCREG) 104 and a second count register (SCRBG) 105 for storing therein comparison data with count values of the counters 102 and 103.

The pre-stage counter 101 counts down a clock signal CLK generated by a clock pulse generator not shown from an initial value. The initial value of the pre-stage counter 101 is reloaded by the timer control circuit 100 in response to detection of the crank pulse event.

The first counter 102 counts up count-out pulses from the initial value to a value 0 by the pre-stage counter 101. The value of the pre-stage counter 101 is cleared to the initial value 0 in response to detection of the crank pulse event by the timer control circuit 100. The timer control circuit 100 sets the first reference value in the first count register 104 on the basis of control of the CPU 20. As described above, when the toothless structure is so constructed that two pulses come out every 360 degrees of the crank rotation angle in the toothless part of the crank signal POS, the count value by the first counter 102 corresponding to two cycles of the event pulse cycle is adopted as the first reference value, for example. Theoretically, a value larger than the count value by the first counter 102 corresponding to one cycle of the event pulse cycle may be adopted. Accordingly, when tire interval of the crank pulse event corresponds to the toothless part of the crank signal POS, the count value of the first counter 102 exceeds the set value of the first count register 104, so that a comparison output φFC of first comparator (FCMP) 106 is inverted from low level to high level in response to this state (first state). When the interval of the crank pulse event corresponds to other part except the toothless part of the crank signal POS, the count value of the first counter 102 does not exceed the set value of the first count register 104 and accordingly the output φFC of the first comparator 106 is maintained to be low level. This first state can distinguish the pulse interval (large pulse interval) corresponding to the count value of the first counter 102 equal to or larger than the reference value of the first count register 104 from the pulse interval (small pulse interval) corresponding to the count value of the first counter 102 smaller than the reference value of the first count register 104.

Although particularly not limited, the first reference value set in the first count register 104 is set to be a specific value when the engine system applied or an engine control mode is decided. Accordingly, the frequency of the clock signal CLK equal to the multiple of frequency of the crank signal according to the pulse period of the crank signal is changed in accordance with the rotation number of the engine. At this time, when the pre-stage counter 101 of the first counter 102 is used as a down counter and its count-out pulse is counted by the first counter 102, change in the rotation number of the engine can be treated by the preset value reloaded in the pre-stage counter 101 without frequently changing the frequency of the clock signal CLK in accordance with the rotation number of the engine. This means that kinds of the frequencies selectable by the clock pulse generator can be reduced.

The second counter 103 counts up count-out pulses from the initial value to the value 0 by the pre-stage counter 101. However, the up-count value for each count-out pulse of the pre-stage counter 101 is equal to plural times of the up-count value of the first counter 102 and is set in a multiple setting register 110, for example. That is, the second counter 103 makes increment operation in which the set value of the multiple setting register 110 is added to the count value just before the addition for each increment of +1 by the first counter 102. The writing of the value in the multiple setting register 110 is made by the CPU 20. As described above, when the toothless structure is so constructed that two pulses come out every 360 degrees of the crank rotation angle in the toothless part of the crank signal POS, the set value of the multiple setting register 110 may be larger than 1 and smaller than 3 theoretically. In the embodiment, for example, 2.5 is adopted as the set value. Accordingly, the count value of the second counter 103 is 2.5 times of that of the first counter 101.

The second count register 105 is loaded with the count value of the first counter 102 in response to detection of the crank pulse event by the timer control circuit 100 before the count value of the first counter 102 is cleared. Accordingly, the second count register 105 holds the loaded value until the next crank pulse event is detected. A second comparator (SCMP) 107 compares the count value of the second counter 103 with the value of the second count register 105 and the comparison means that the value of the second counter 103 in the event pulse cycle at this time is compared with the value of the first counter 103 in the event pulse cycle just before the comparison. Accordingly, if the event pulse cycle just before the comparison does not correspond to the toothless part, the value held in the second count register 105 is the count value by the first counter 102 corresponding to one event pulse cycle that does not correspond to the toothless part. Hence, whether the event pulse cycle at this time corresponds to the toothless part or not, the value of the second counter 103 which outputs the count value of 2.5 times is always large and a comparison output φFC of the second comparator 107 is maintained to be low level. On the contrary, when the event pulse cycle just before the comparison corresponds to the toothless part, the value held in the second count register 105 is equal to the count value by the first counter 102 corresponding to three event pulse cycles corresponding to the toothless part. Accordingly, when the event pulse cycle at this time does not correspond to the toothless part, the value of the second counter 103 which outputs the count value corresponding to one event pulse cycle is made small. It can be judged by this state (second state) that the count value by the second counter 103 which makes counting of plural times, for example 2.5 times, of the count value of the first counter 102 is smaller than the count value of the first counter 102 at the last event pulse interval, that is, the count value of 2.5 times at small pulse interval by the second counter 103 is smaller than the count value at large pulse interval (corresponding to toothless part) by the first counter 102.

An interrupt processing circuit 108 supplies an interrupt request signal IRQi to the interrupt control circuit 30 in accordance with the states of the comparison result signals φFC and φSC and a mode set state by the CPU 20 to the detection mode register 111. The interrupt processing circuit 108 forms an example of a detection circuit which can detect any of the first and second states together with the comparators 106 and 107.

The toothless-part detection processing mode which can be set in the toothless-part detection processing is any of the first detection mode in which long event pulse is detected on the basis of short event pulse and materialization of the first state is detected using signal φFC, the second detection mode in which short event pulse is detected on the basis of long event pulse and materialization of the second state is detected using signal φSC and the third detection mode in which materialization of both the first and second states is detected, although particularly not limited. The respective modes are designated by distinguishable command code and the timer control circuit 100 decodes the command code to make designation to the interrupt processing circuit 108.

FIG. 4 shows the operation timing of the toothless processing. In FIG. 4, the toothless part exists from time t(n−1) to time t(n). When an event pulse occurs at time t(n−2) just before the toothless part, the first counter 102 and the second counter 103 make increment operation with difference of 2.5 times. When an event pulse occurs at next time t(n−1), the value of the first counter 102 is loaded in the second count register 105 and the first and second counters 102 and 103 are initialized. Then, the first and second counters 102 and 103 restart increment operation with difference of 2.5 times. At time t(n−1), φFC=L (low level) since FCREG≥FCOUNT and φSC=L (low level) since SCOUNT≥SCREG.

During time t(n−1) to t(n), FCOUNT≥FCREG and φFC=H (high level) at time t(m) although φSC=L (low level) is maintained since SCOUNT≥SCREG (n−1) is left as it is. This state is decided in response to occurrence of the event pulse at time t(n) and is grasped by the interrupt processing circuit 108. When the first detection mode is designated to the interrupt processing circuit, the interrupt request signal IRQ is supplied to the CPU 20 in synchronism with occurrence of the event pulse at next time t(n+1).

When the event pulse occurs at time t(n), the value of the first counter 102 is loaded to the second count register 105 and the first and second counters 102 and 103 are initialized and then restart increment operation with difference of 2.5 similarly. At this time, the value loaded into the second count register 105 is three times of the value at the last time. At time (n+1), φSC=H (high level) since SCREG(n)≥SCOUNT. Further, since FCREG≥FCOUNT, φFC=L (low level) is left as it is. The state of φSC=H (high level) is decided in response to occurrence of the event pulse at time t(n+1) and grasped by the interrupt processing circuit 108. When the second detection mode is designated to the interrupt processing circuit, the interrupt request signal IRQ is supplied to the CPU 20 in synchronism with occurrence of the event pulse at next time t(n+2). When the third detection mode is designated to the interrupt processing circuit, decision of φFC=H and φSC=H is detected at consecutive time t(n) and time t(n+1), respectively, that is, the logical product condition of decision of φFC=H and φSC=H at consecutive times is satisfied, so that the interrupt request signal IRQ is supplied to the CPU 20 in synchronism with occurrence of the event pulse at next time t(n+2).

As apparent from the foregoing, the pulse interval (large pulse interval) corresponding to the count value equal to or larger than the reference value by the first counter 102 can be distinguished from the pulse interval (small pulse interval) corresponding to the count value smaller than the reference value by the first counter 102. Further it can be judged that the count value by the second counter 103 which makes counting of plural times of the count value of the first counter 102 is smaller than the count value (value held in the second count register 105) of the first counter 102 at the last pulse interval, that is, the count value at small pulse interval by the second counter 103 is smaller than the count value at large pulse interval by the first counter 102. In brief, the fact that the large pulse interval exists behind can be distinguished on the basis of the small pulse interval existing before by detecting the first state by the signal φFC and the fact that the small pulse interval exists behind can be distinguished on the basis of the large pulse interval existing before by detecting the second state by the signal φSC.

Accordingly, when occurrence of the situation in which the count values of plural pulse intervals containing the toothless part are small as in the case where the toothless part is detected near the top dead point is anticipated, the toothless part can be detected exactly by detecting the second state in the pulse detection case where it is considered that the detection accuracy of toothless part is reduced in detection of the first state under the environment in which mechanical vibration is increased as low-speed traveling of a hybrid car.

The detection of the first and second states is performed in hardware using the counting operation by counters and comparison of count value and register value and accordingly the processing time can be shortened as compared with division of count values obtained from the pulse intervals before and after the toothless part, so that the real-time property of engine control can be improved.

The third detection mode in which materialization of both the first and second states is detected can be adopted to thereby enhance the detection accuracy of toothless part to a highest level. Since the first and second detection modes can be designated independently, higher-rank compatibility to detection of toothless part can be attained easily.

It is needless to say that the present invention is not limbed to the above embodiment and various modifications may be made without departing from the spirit and scope of the invention.

For example, the processing to detection result of toothless pan is not limited to the interrupt to CPU. The configuration using other hardware logic and accelerator can be adopted.

Further, dedicated hardware may be adopted in the timer part in order to reduce load on CPU to detection result of toothless part. In brief, processing to detection result of toothless part is performed by the timer itself. The timer part can be intellectualized using a program processing circuit or be realized by provision of a dedicated logic circuit. In this case, setting of register may be made using a data transfer control apparatus instead of CPU.

The counting of plural times of the count value by the second counter is not limited to addition of the set multiple value and may multiply clock frequency of the first counter in accordance with the multiple. However, a clock multiple circuit is required to increase circuit scale.

The first and second counters 102 and 103 are not limited to the configuration in which the pre-stage counter 101 is disposed in common mutually and may be modified properly.

The engine control system or the microcomputer of the embodiment is not limited to application to a gasoline-engined cap a diesel car and a hybrid car and can be applied to a mechanical apparatus using engine such as an electric train, a steam tram, a ship and the like widely.

The toothless-part judgment mode in the toothless-part detection processing is not limited to the configuration in which any of the first, second and third detection modes can be set. Only the first and second detection modes may be selected or only the third detection mode may be selected.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A semiconductor data processing apparatus comprising a CPU to execute programs and a timer part connected to the CPU, the timer pan including a first counter to make counting operation for each of pulse intervals of a predetermined event pulse train from an initial value, a first count register to which a first reference value is set, a second counter to make counting operation from an initial value so that a count value thereof is equal to plural times of the count value of the first counter for each of pulse intervals of the predetermined event pulse train, a second count register to hold the count value of the first counter for each of pulse intervals of the predetermined event pulse train and a detection circuit which can detect any of a first state in which the count value for each of the pulse intervals by the first counter is equal to or larger than the first reference value set in the first count register and a second state in which the count value for each of the pulse intervals by the second counter is equal to or smaller than the value held in the second count register.

2. A semiconductor data processing apparatus according to claim 1, wherein the detection circuit can select any of a first detection mode in which materialization of the first state is detected and a second detection mode in which materialization of the second state is detected.

3. A semiconductor data processing apparatus according to claim 2, wherein the detection circuit can further select a third detection mode in which materialization of both the first and second states is detected.

4. A semiconductor data processing apparatus according to claim 3, comprising a detection mode register which designates which of the first, second or third detection mode is selected.

5. A semiconductor data processing apparatus according to claim 3, further comprising an interrupt control part which controls an interrupt to the CPU in response to an interrupt request from the timer part and wherein the detection circuit supplies an interrupt request signal to the interrupt control part by detecting materialization of the first state when the first detection mode is designated, supplies the interrupt request signal to the interrupt control part by detecting materialization of the second state when the second detection mode is designated and supplies the interrupt request signal to the interrupt control part by detecting materialization of a third state when the third detection mode is designated.

6. A semiconductor data processing apparatus according to claim 2, comprising a detection mode register which designates which of the first or second detection mode is selected.

7. A semiconductor data processing apparatus according to claim 2, further comprising an interrupt control part which controls an interrupt to the CPU in response to an interrupt request from the timer part and wherein the detection circuit supplies an interrupt request signal to the interrupt control part by detecting materialization of the first state when the first detection mode is designated and supplies the interrupt request signal to the interrupt control part by detecting materialization of the second state when the second detection mode is designated.

8. A semiconductor data processing apparatus according to claim 1, wherein the detection circuit can select a third detection mode in which materialization of both the first and second states is detected.

9. A semiconductor data processing apparatus according to claim 1, comprising a multiple setting register which designates a multiple that is plural times of the count value of the first counter in the second counter.

10. A semiconductor data processing apparatus according to claim 9, wherein the multiple setting register and the detection mode register are registers which are disposed in address space of the CPU.

11. A semiconductor data processing apparatus according to claim 9, wherein the second counter makes increment operation in which a set value of the multiple setting register is added to the count value just before the addition for each increment of +1 by the first counter.

12. An engine control apparatus constituting an electronic control apparatus comprising an interface part which receives an output of a crank angle sensor to produce a train of pulses each produced for each of predetermined angular intervals in response to rotation of a crank shaft of an engine and a data processing part which is supplied with the pulse train produced from the interface part and judges a fixed position of the crank shaft on the basis of difference in pulse intervals of the pulse train, and wherein
the data processing part includes a first counter to make counting operation for each of pulse intervals of a predetermined event pulse train from an initial value, a first count register to which a first reference value is set, a second counter to make counting operation from an initial value so that a count value thereof is equal to plural times of the count value of the first counter for each of pulse intervals of the predetermined event pulse train, a second count register to hold the count value of the first counter for each of pulse intervals of the predetermined event pulse train, a detection circuit which can detect any of a first state in which the count value for each of the pulse intervals by the first counter is equal to or larger than the first reference value set in the first count register and a second state in which the count value for each of the pulse intervals by the second counter is equal to or smaller than the value held in the second count register in order to judge the fixed position of the crank shaft and a control circuit which controls the engine on the basis of detection result of the detection circuit.

13. An engine control apparatus according to claim 12, wherein the detection circuit is set to any detection mode of a first detection mode in which materialization of the first state is detected or a second detection mode in which materialization of the second state is detected in accordance with a state of a detection mode register in order to judge tire fixed position of the crank shaft.

14. An engine control apparatus according to claim 12, wherein the detection circuit is set to any of a first detection mode in which materialization of the first state is detected, a second detection erode in which materialization of the second state is detected or a third detection mode in which materialization of both the first and second states is detected in accordance with a state of a detection mode register in order to judge the fixed position of the crank shaft.

15. An engine control apparatus according to claim 12, wherein the detection circuit is set to a third detection mode in which materialization of both the first and second states is detected as a detection mode for judging the fixed position of the crank shaft.

16. An engine control apparatus according to claim 12, comprising a multiple setting register which designates a multiple that is plural times of the count value of the first counter in the second counter.

17. An engine control apparatus according to claim 16, wherein the second counter makes increment operation in which a set value of the multiple setting register is added to the count value just before the addition for each increment of +1 by the first counter.

18. An engine control apparatus according to claim 12, wherein the data processing part includes a CPU and the multiple setting register and the detection mode register are registers which are disposed in address space of the CPU.

19. An engine control apparatus according to claim 18, wherein the data processing part is a microcomputer constituted of semiconductor integrated circuit.

20. An engine control apparatus according to claim 12, wherein the pulse intervals of the pulse train include first pulse intervals corresponding to a first rotation angle in one rotation of the crank shaft of the engine and second pulse intervals corresponding to a second rotation angle equal to plural times of the first rotation angle, and a multiple which can be set in a multiple setting register is smaller than a value corresponding to a multiple that is plural times of the first rotation angle to the second rotation angle and larger than 1.

* * * * *